United States Patent
Cheema et al.

(10) Patent No.: US 12,362,817 B2
(45) Date of Patent: Jul. 15, 2025

(54) CONFIGURING A POLARIZATION TYPE

(71) Applicant: Lenovo (Singapore) Pte. Ltd., New Tech Park (SG)

(72) Inventors: Sher Ali Cheema, Ilmenau (DE); Ankit Bhamri, Rödermark (DE); Ali Ramadan Ali, Kraiburg am Inn (DE); Majid Ghanbarinejad, Chicago, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 24 days.

(21) Appl. No.: 18/255,961

(22) PCT Filed: Dec. 4, 2021

(86) PCT No.: PCT/IB2021/061340
§ 371 (c)(1),
(2) Date: Jun. 5, 2023

(87) PCT Pub. No.: WO2022/118295
PCT Pub. Date: Jun. 9, 2022

(65) Prior Publication Data
US 2024/0031001 A1  Jan. 25, 2024

Related U.S. Application Data

(60) Provisional application No. 63/121,445, filed on Dec. 4, 2020.

(51) Int. Cl.
*H04B 7/10* (2017.01)
*H04B 7/06* (2006.01)
*H04W 36/08* (2009.01)

(52) U.S. Cl.
CPC ............. *H04B 7/10* (2013.01); *H04B 7/063* (2013.01); *H04W 36/08* (2013.01)

(58) Field of Classification Search
CPC .......... H04B 7/10; H04B 7/063; H04W 36/08
(Continued)

(56) References Cited

U.S. PATENT DOCUMENTS

2020/0153488 A1* 5/2020 Wu ............... H04B 7/0417
2020/0367083 A1* 11/2020 Hao .............. H04B 7/0695
(Continued)

FOREIGN PATENT DOCUMENTS

| WO | WO-2020011714 A1 * | 1/2020 | ........ H04B 7/0417 |
| WO | WO-2020011930 A1 * | 1/2020 | ........ H04B 7/0452 |
| WO | WO-2020064914 A1 * | 4/2020 | ........ H04B 7/0695 |

OTHER PUBLICATIONS

PCT/IB2021/061340, "Notification of Transmittal of the International Search Report and the Written Opinion of the International Searching Authority, or the Declaration", International Searching Authority, Mar. 11, 2022, pp. 1-13.
(Continued)

*Primary Examiner* — Emmanuel Bayard
(74) *Attorney, Agent, or Firm* — Kunzler Bean & Adamson

(57) ABSTRACT

Apparatuses, methods, and systems are disclosed for configuring a polarization type. One method includes receiving configuration information from a network device for employing a polarization multiplexing mode. The configuration information includes: information for applying at least two polarization types for downlink data reception; information for applying at least two polarization types for uplink data transmission; or a combination thereof.

20 Claims, 10 Drawing Sheets

(58) Field of Classification Search
USPC .......................................... 375/262, 267, 299
See application file for complete search history.

(56) References Cited

U.S. PATENT DOCUMENTS

2022/0109543 A1* 4/2022 Ma ......................... H04L 5/0091
2022/0174531 A1* 6/2022 Zhu ...................... H04B 17/318
2022/0352971 A1* 11/2022 Liberg ............... H04B 7/18519

OTHER PUBLICATIONS

PCT/IB2021/061338, "Notification of Transmittal of the International Search Report and the Written Opinion of the International Searching Authority, or the Declaration", International Searching Authority, Mar. 14, 2022, pp. 1-11.
Huawei et al., "Discussion on other design aspects for NTN", 3GPP TSG RAN WG1 Meeting #102-e R1-2005268, Aug. 17-28, 2020, pp. 1-4.
CATT, "Other Aspects of NR-NTN", 3GPP TSG RAN WG1 #103-e R1-2007857, Oct. 26-Nov. 13, 2020, pp. 1-8.
Huawei et al., "Discussion on other design aspects for NTN", 3GPP TSG RAN WG1 Meeting #103-e R1-2008319, Oct. 26-Nov. 13, 2020, pp. 1-5.
Panasonic, "SSB, beam management and polarization signaling for NTN", 3GPP TSG-RAN WG1 #103-e R1-2009026, Oct. 26-Nov. 6, 2020, pp. 1-4.
Ericsson, "On other enhancements for NTN", 3GPP TSG-RAN WG1 Meeting #103-e R1-2009094, Oct. 26-Nov. 13, 2020, pp. 1-9.
Qualcomm Inc., "BWP operation and other issues for NTN", 3GPP TSG RAN WG1 #103-e R1-2009265, Oct. 26-Nov. 13, 2020, pp. 1-11.
Mediatek Inc. "Summary #3 of 8.4.4 Other Aspects of NR-NTN", 3GPP TSG RAN WG1 Meeting #103e R1-2009581, Oct. 26-Nov. 13, 2020, pp. 1-47.
3GPP, "3rd Generation Partnership Project; Technical Specification Group Radio Access Network; Solutions for NR to support non-terrestrial networks (NTN) (Release 16)", 3GPP TR 38.821 V16.0.0, Dec. 2019, pp. 1-140.

* cited by examiner

CONFIGURING A POLARIZATION TYPE

CROSS-REFERENCE TO RELATED APPLICATIONS

This application claims priority to U.S. Patent Application Ser. No. 63/121,445 entitled "APPARATUSES, METHODS, AND SYSTEMS FOR POLARIZATION INDICATION" and filed on Dec. 4, 2020 for Sher Ali Cheema, which is incorporated herein by reference in its entirety.

FIELD

The subject matter disclosed herein relates generally to wireless communications and more particularly relates to configuring a polarization type.

BACKGROUND

In certain wireless communications networks, polarization may be used. In such networks, the polarization may not function optimally.

BRIEF SUMMARY

Methods for configuring a polarization type are disclosed. Apparatuses and systems also perform the functions of the methods. One embodiment of a method includes receiving, at a user equipment, first configuration information from a network device for a serving cell. The first configuration information indicates at least one polarization type for downlink reception, for uplink transmission, or a combination thereof. In some embodiments, the method includes receiving second configuration information from the network device for a handover procedure to a target cell. The second configuration information indicates at least one polarization type for downlink reception, for uplink transmission, or a combination thereof.

One apparatus for configuring a polarization type includes a user equipment. In some embodiments, the apparatus includes a receiver that: receives first configuration information from a network device for a serving cell, wherein the first configuration information indicates at least one polarization type for downlink reception, for uplink transmission, or a combination thereof; and receives second configuration information from the network device for a handover procedure to a target cell. The second configuration information indicates at least one polarization type for downlink reception, for uplink transmission, or a combination thereof.

Another embodiment of a method for configuring a polarization type includes transmitting, from a network device, first configuration information for a serving cell. The first configuration information indicates at least one polarization type for downlink reception, for uplink transmission, or a combination thereof. In some embodiments, the method includes transmitting second configuration information for a handover procedure to a target cell. The second configuration information indicates at least one polarization type for downlink reception, for uplink transmission, or a combination thereof.

Another apparatus for configuring a polarization type includes a network device. In some embodiments, the apparatus includes a transmitter that: transmits first configuration information for a serving cell, wherein the first configuration information indicates at least one polarization type for downlink reception, for uplink transmission, or a combination thereof; and transmits second configuration information for a handover procedure to a target cell. The second configuration information indicates at least one polarization type for downlink reception, for uplink transmission, or a combination thereof.

One embodiment of a method for configuring a polarization type includes receiving, at a user equipment, configuration information from a network device for employing a polarization multiplexing mode. The configuration information includes: information for applying at least two polarization types for downlink data reception; information for applying at least two polarization types for uplink data transmission; or a combination thereof.

One apparatus for configuring a polarization type includes a user equipment. In some embodiments, the apparatus includes a receiver that receives configuration information from a network device for employing a polarization multiplexing mode. The configuration information includes: information for applying at least two polarization types for downlink data reception; information for applying at least two polarization types for uplink data transmission; or a combination thereof.

Another embodiment of a method for configuring a polarization type includes transmitting, from a network device, configuration information for employing a polarization multiplexing mode. The configuration information includes: information for applying at least two polarization types for downlink data reception; information for applying at least two polarization types for uplink data transmission; or a combination thereof.

Another apparatus for configuring a polarization type includes a network device. In some embodiments, the apparatus includes a transmitter that transmits configuration information for employing a polarization multiplexing mode. The configuration information includes: information for applying at least two polarization types for downlink data reception; information for applying at least two polarization types for uplink data transmission; or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
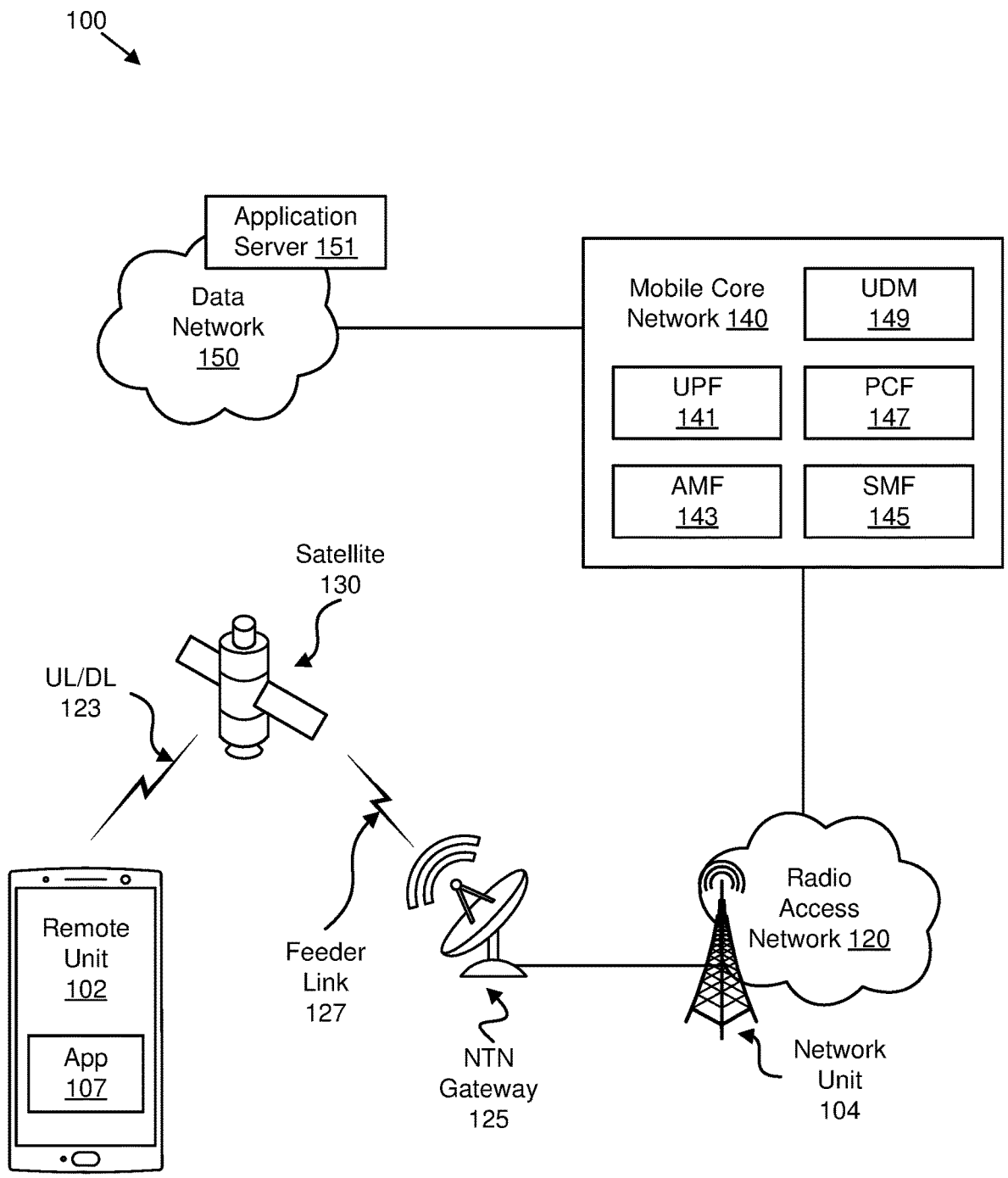
FIG. 1 is a schematic block diagram illustrating one embodiment of a wireless communication system for configuring a polarization type.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a polarization type. In one embodiment, the wireless communication system 100 includes at least one remote unit 102, a radio access network ("RAN") 120, and a mobile core network 140. The RAN 120 and the mobile core network 140 form a mobile communication network. The RAN 120 may be composed of a network unit 104 with which the remote unit 102 communicates via a satellite 130 using wireless communication links 123. As depicted, the mobile communication network includes an "on-ground" network unit 104 which serves the remote unit 102 via satellite access.

Even though a specific number of remote units 102, network units 104, wireless communication links 123, RANs 120, satellites 130, non-terrestrial network gateways 125 (e.g., satellite ground/earth devices), and mobile core networks 140 are depicted in FIG. 1, one of skill in the art will recognize that any number of remote units 102, network units 104, wireless communication links 123, RANs 120, satellites 130, non-terrestrial network gateways 125, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 102 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 102 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 102 may include a terminal equipment ("TE") and/or be embedded in an appliance or device (e.g., a computing device, as described above).

The remote units 102 may communicate directly with one or more of the network units 104 in the RAN 120 via uplink ("UL") and downlink ("DL") communication signals. In some embodiments, the remote units 102 communicate in a non-terrestrial network via UL and DL communication signals between the remote unit 102 and a satellite 130. In certain embodiments, the satellite 130 may communicate with the RAN 120 via an NTN gateway 125 using UL and DL communication signals between the satellite 130 and the NTN gateway 125. The NTN gateway 125 may communicate directly with the network units 104 in the RAN 120 via UL and DL communication signals. Furthermore, the UL and DL communication signals may be carried over the wireless communication links 123. Here, the RAN 120 is an intermediate network that provides the remote units 102 with access to the mobile core network 140. Moreover, the satellite 130 provides a non-terrestrial network allowing the remote unit 102 to access the mobile core network 140 via satellite access. While FIG. 1 depicts a transparent NTN system where the satellite 130 repeats the waveform signal for the network unit 104, in other embodiments the satellite 130 (for regenerative NTN system), or the NTN gateway 125 (for alternative implementation of transparent NTN system) may also act as base station, depending on the deployed configuration.

In some embodiments, the remote units 102 communicate with an application server 151 via a network connection with the mobile core network 140. For example, an application 107 (e.g., web browser, media client, telephone and/or Voice-over-Internet-Protocol ("VoIP") application) in a remote unit 102 may trigger the remote unit 102 to establish a protocol data unit ("PDU") session (or other data connection) with the mobile core network 140 via the RAN 120. The mobile core network 140 then relays traffic between the remote unit 102 and the application server 151 in the packet data network 150 using the PDU session. The PDU session represents a logical connection between the remote unit 102 and the User Plane Function ("UPF") 141.

In order to establish the PDU session (or PDN connection), the remote unit 102 must be registered with the mobile core network 140 (also referred to as "attached to the mobile core network" in the context of a Fourth Generation ("4G") system). Note that the remote unit 102 may establish one or more PDU sessions (or other data connections) with the mobile core network 140. As such, the remote unit 102 may have at least one PDU session for communicating with the packet data network 150. The remote unit 102 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 102 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 102 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The network units 104 may be distributed over a geographic region. In certain embodiments, a network unit 104 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The network units 104 are generally part of a RAN, such as the RAN 120, that may include one or more controllers communicably coupled to one or more corresponding network units 104. These and other elements of radio access network are not illustrated but are well known generally by those having ordinary skill in the art. The network units 104 connect to the mobile core network 140 via the RAN 120. Note that in the NTN scenario certain RAN entities or functions may be incorporated into the satellite 130. For example, the satellite 130 may be an embodiment of a Non-Terrestrial base station/base unit.

The network units 104 may serve a number of remote units 102 within a serving area, for example, a cell or a cell sector, via a wireless communication link 123. The network units 104 may communicate directly with one or more of the remote units 102 via communication signals. Generally, the network units 104 transmit DL communication signals to serve the remote units 102 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 102 and/or one or more of the network units 104. Note that during NR operation on unlicensed spectrum (referred to as "NR-U"), the network unit 104 and the remote unit 102 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 102 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR", also referred to as "Unified Data Repository"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the Fifth Generation Core network ("5GC"). When present, the AUSF may act as an authentication server and/or authentication proxy, thereby allowing the AMF 143 to authenticate a remote unit 102. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 102 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for dynamically adapting a measurement behavior apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station/base unit, but it is replaceable by any other radio access node, e.g., gNB, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for dynamically adapting a measurement behavior.

In various embodiments, a remote unit 102 may receive first configuration information from a network device for a serving cell. The first configuration information indicates at least one polarization type for downlink reception, for uplink transmission, or a combination thereof. In some embodiments, the remote unit 102 may receive second configuration information from the network device for a handover procedure to a target cell. The second configuration information indicates at least one polarization type for downlink reception, for uplink transmission, or a combination thereof. Accordingly, the remote unit 102 may be used for configuring a polarization type.

In certain embodiments, a network unit 104 and/or a mobile core network 140 may transmit first configuration information for a serving cell. The first configuration information indicates at least one polarization type for downlink reception, for uplink transmission, or a combination thereof. In some embodiments, the network unit 104 and/or the mobile core network 140 may transmit second configuration information for a handover procedure to a target cell. The second configuration information indicates at least one polarization type for downlink reception, for uplink transmission, or a combination thereof. Accordingly, the network unit 104 and/or the mobile core network 140 may be used for configuring a polarization type.

In various embodiments, a remote unit 102 may receive configuration information from a network device for employing a polarization multiplexing mode. The configuration information includes: information for applying at least two polarization types for downlink data reception; information for applying at least two polarization types for uplink data transmission; or a combination thereof. Accordingly, the remote unit 102 may be used for configuring a polarization type.

In certain embodiments, a network unit 104 and/or a mobile core network 140 may transmit configuration information for employing a polarization multiplexing mode. The configuration information includes: information for applying at least two polarization types for downlink data reception; information for applying at least two polarization types for uplink data transmission; or a combination thereof. Accordingly, the network unit 104 and/or the mobile core network 140 may be used for configuring a polarization type.

Figure 2:
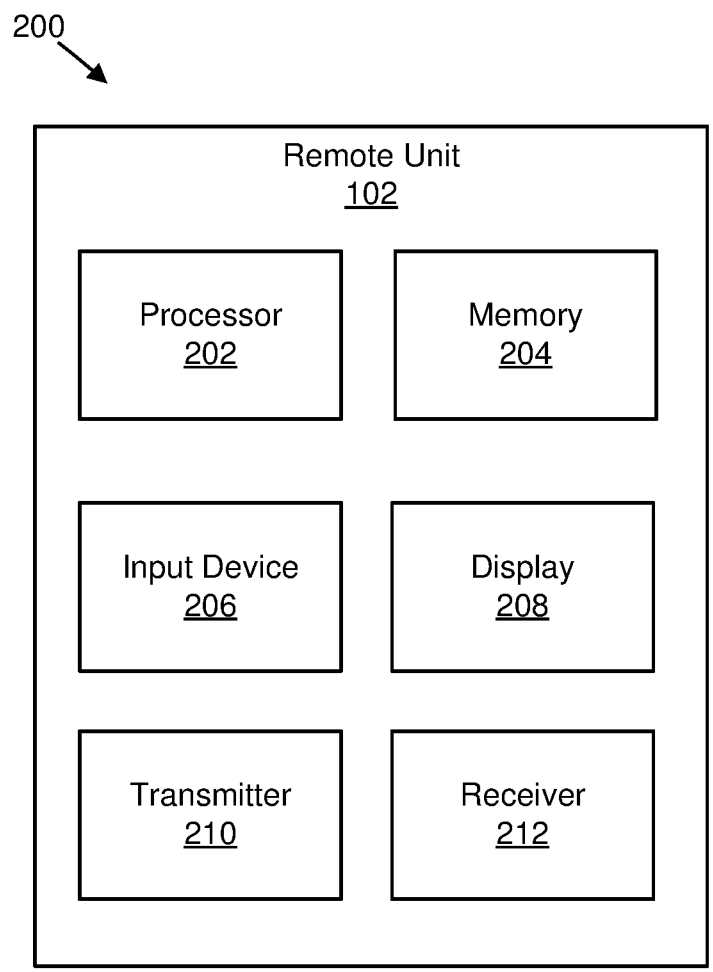
FIG. 2 is a schematic block diagram illustrating one embodiment of an apparatus that may be used for configuring a polarization type.

FIG. 2 depicts one embodiment of an apparatus 200 that may be used for configuring a polarization type. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives first configuration information from a network device for a serving cell, wherein the first configuration information indicates at least one polarization type for downlink reception, for uplink transmission, or a combination thereof; and receives second configuration information from the network device for a handover procedure to a target cell. The second configuration information indicates at least one polarization type for downlink reception, for uplink transmission, or a combination thereof.

In some embodiments, the receiver 212 receives configuration information from a network device for employing a polarization multiplexing mode. The configuration information includes: information for applying at least two polarization types for downlink data reception; information for applying at least two polarization types for uplink data transmission; or a combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
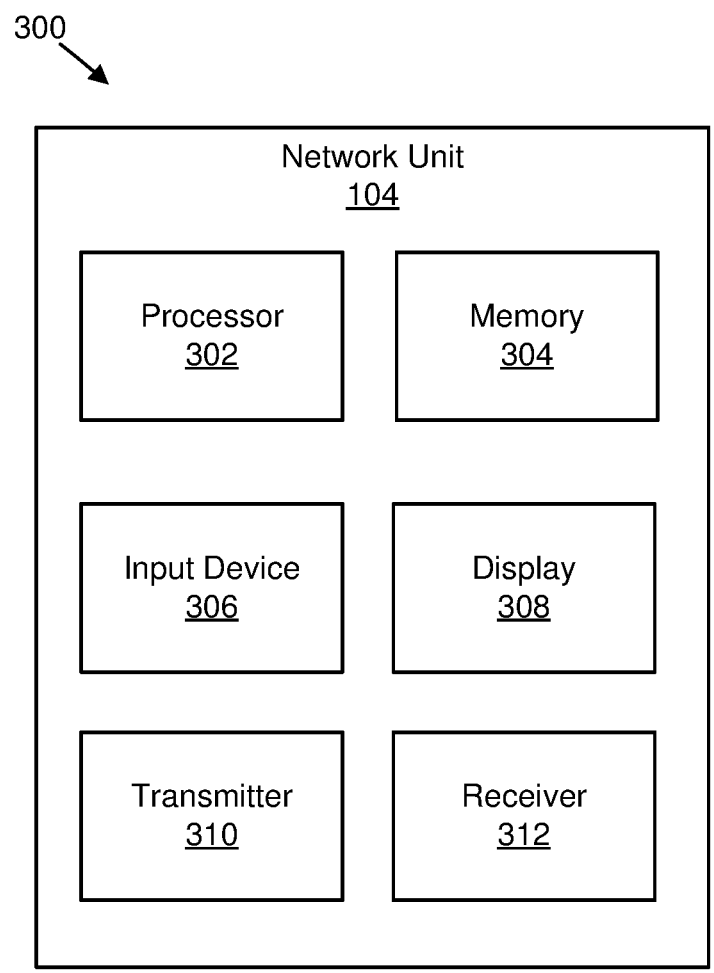
FIG. 3 is a schematic block diagram illustrating one embodiment of an apparatus that may be used for configuring a polarization type.

FIG. 3 depicts one embodiment of an apparatus 300 that may be used for configuring a polarization type. The apparatus 300 includes one embodiment of the network unit 104 and/or one or more functions of the mobile core network 140. Furthermore, the network unit 104 and/or one or more functions of the mobile core network 140 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits first configuration information for a serving cell, wherein the first configuration information indicates at least one polarization type for downlink reception, for uplink transmission, or a combination thereof; and transmits second configuration information for a handover procedure to a target cell. The second configuration information indicates at least one polarization type for downlink reception, for uplink transmission, or a combination thereof.

In some embodiments, the transmitter 310 transmits configuration information for employing a polarization multiplexing mode. The configuration information includes: information for applying at least two polarization types for downlink data reception; information for applying at least two polarization types for uplink data transmission; or a combination thereof.

In certain embodiments, features may be enhanced to address issues due to long propagation delays, large Doppler effects, and moving cells in a non-terrestrial network ("NTN"), such as the following: 1) timing relationship enhancements; 2) enhancements on uplink ("UL") time and frequency synchronization; and/or 3) hybrid automatic repeat request ("HARQ"), a) number of HARQ process, b) enabling and/or disabling of HARQ feedback.

In some embodiments, there may be: 1) enhancement to a physical random access channel ("PRACH") sequence and/or format and extension of a ra-ResponseWindow duration (e.g., if a user equipment ("UE") with global navigation satellite system ("GNSS") capability but without pre-compensation of timing and frequency offset capabilities); 2) feeder link switch; and/or 3) beam management and bandwidth part ("BWP") operation for NTN with frequency reuse such as by including signaling of a polarization mode.

In various embodiments, circular polarization may be widely used in satellite communications due to its advantages such as inter cell interference mitigation, higher spectral efficiency, spectrum sharing, and robustness against atmospheric losses. In certain embodiments, satellite systems employ polarization (e.g., different) for different frequency bands (e.g., circular polarization at a higher frequency band and linear polarization at lower frequency bands). On the other hand, UEs in a cell may support polarization (e.g., different) configurations (e.g., single polarization, and multiple polarization). In some embodiments, to avoid polarization mismatch errors, a polarization synchronization may be made between a satellite and a UE. Depending upon the polarization capabilities of a UE, a gNB may schedule different resources for UEs. Therefore, a UE may be required to indicate its supported polarizations to a gNB.

In various embodiments described herein, there may be a polarization configuration, indication, a multiplexing with different polarization, and/or a corresponding association with beams and/or BWPs.

In certain embodiments, there may be a configuration and/or indication of polarization types (e.g., different) that may be dynamically indicated to a UE (e.g., based on a UE reported capability) by a gNB during an initial access and/or via downlink control information ("DCI") for corresponding downlink ("DL") and/or UL transmissions. Further, in some embodiments, there may be joint or separate indications of a polarization type along with a BWP index and/or beam identifier ("ID") (e.g., transmission configuration indicator ("TCI") state) and/or a corresponding multiplexing type such as spatial multiplexing, mobile user ("MU") multiple input multiple output ("MIMO") ("MU-MIMO"), and/or transmit diversity. It should be noted that, one or more elements or features from one or more embodiments described herein may be combined.

In a first embodiment, there may be a polarization indication during an initial access. In a first implementation of the first embodiment, there may be a polarization indication in downlink during an initial access. In the first implementation of the first embodiment, a gNB may indicate its polarization type for initial access implicitly or explicitly in a primary synchronization signal ("PSS"), secondary synchronization signal ("SSS"), a physical broadcast channel ("PBCH"), and/or with a preconfigured mapping table. In one embodiment, polarization may be indicated by a reference signal such as a PSS. This formulation may help in avoiding a polarization mismatch errors during a first step of an initial access procedure, thus facilitating improving the probability of the beam detection. For a NTN, a single set of multiple beams may be associated with a cell. Since the minimum beam footprint size in NTN may be relatively large for satellite communications (e.g., typically 100 km for low earth orbit ("LEO") satellites), a number of cell ID requirements may be reduced for NTN, especially for configurations with multiple beams in a cell. In certain embodiments, a maximum number of cell IDs may be fixed and/or reduced from that supported in some configurations (e.g., up to 336 unique physical-layer cell identities ($N_{ID}^{cell}=3N_{ID}^{(1)}+N_{ID}^{(2)}$) corresponding to the value of $N_{ID}^{(1)} \in \{0,1,\ldots,335\}$) and existing three PSS sequences (corresponding to the value of $N_{ID}^{(2)} \in \{0,1,2\}$) may be utilized for polarization and timing indications. For example, the three root sequences may indicate left-hand circular polarization ("LHCP"), right-hand circular polarization ("RHCP"), and linear polarization. For the UE to detect the PSS that carries the polarization indication, the PSS symbol may need to be transmitted using a predefined polarization known to the UE before initial access. In another example, the UE may attempt to receive the PSS using different polarization hypothesis (e.g., RHCP or LHCP) to minimize the detection performance impact from lack of knowledge of the polarization used for PSS transmission. In a further example, the UE may receive a first synchronization signal ("SS") burst set (e.g., set of SS blocks within a beam-sweep) using a first polarization (e.g., RHCP) and receive a second SS burst set using a second polarization (e.g., LHCP). The first SS burst set and the second SS burst set may be consecutive (e.g., the time separation between the first SS block in the first SS burst set and the first SS block in the second SS burst set is same as the SS burst set period—the time between SS-block transmissions with a specific/same beam) or non-consecutive.

In various embodiments, a UE may be informed about a predefined association and/or mapping from cell IDs (or certain bits in the cell ID or certain set of states and/or values of cell ID) to polarization types by a standard or a pre-configuration (e.g., to access a particular network). In certain embodiments, an association may be determined by a configuration from a network. This may be useful if the UE is in a radio resource control ("RRC") connected state and initial access to a new cell is performed (e.g., to a target cell as part of a handover procedure, hence if the UE has had prior access to the network (e.g., on the source cell)).

In certain embodiments, if a terrestrial cellular network is augmented by NTN access (e.g., for extending the coverage, improving the coverage, dual connectivity with terrestrial and non-terrestrial access, and so forth), the association and/or mapping from cell IDs (or certain bits in the cell ID or certain set of states and/or values of cell ID) to polarization types may be provided by a configuration such as an RRC information element ("IE") from a terrestrial base station prior to the initial access procedure between the UE and the NTN (e.g., UE first connects and/or establishes communication with the terrestrial base station which provides assistance information (e.g., association and/or mapping, polarization types, polarization assumption for PSS reception, number of beams and/or SSBs in a cell, whether cell is associated with a single beam and/or SSB or multiple beams and/or SSBs) for initial access to the NTN network).

In some embodiments, a configuration may be a dedicated configuration signaling or a cell-common (e.g., system information block ("SIB")) signaling from the network. The information may be carried by a field in a configuration IE (e.g., such as an NTN-AccessInfo IE) that provides information to a UE to access and communicate with an NTN.

In another implementation of the first embodiment, two PSS symbols may be used, where a first PSS symbol is used for cell ID indication and a second PSS symbol is used for polarization indication. Different root sequences such as short root sequences, or different cyclic shifts of the base m-sequence (e.g., same length-127 m-sequence as used for first PSS symbol (used for cell ID detection) but with different cyclic shifts than those used for first PSS symbol) may be used to indicate a pre-configured polarization type with each sequence.

In a further implantation of the first embodiment, a scrambling sequence generator initialization of a demodulation reference signal ("DMRS") sequence in the PBCH may be used to indicate a polarization type or may be based on the polarization type. Such indication may be especially helpful in NTN scenarios where one beam is associated as a cell, so it may require only a default synchronization signal block ("SSB") index (e.g., 1 SSB per SS burst set, limiting the maximum number of DMRS sequences to <=8 as in current NR specification—e.g., 3 polarization types×2 half-frame number (first half-frame or second half-frame)). For multi beams in a cell, a number of beams may be limited and may be indicated by payload bits of a PBCH.

In various implementations of the first embodiment, a PBCH payload may be extended with extra bits or spare bits in the PBCH payload may be used to indicate a polarization type (e.g., LHCP, RHCP, linear).

In certain implementations of the first embodiment, a single or multiple polarization types may be associated with a frequency (e.g., in a frequency raster for an initial access procedure (e.g., linear polarization may be assigned in lower frequency bands (such as frequency range 1 ("FR1")) while a single or multiple polarization may be assigned in higher frequency bands (such as frequency range 2 ("FR2"))). Such configuration may help in a robust initial access process. If a UE may still infer an incorrect polarization due to reflections of radio signals received from an NTN (e.g., if multiple polarizations are allocated to a frequency band) additional information may be conveyed to the UE by either a standard specification, a network pre-configuration, or a control signal.

In a second embodiment, there may be a UE polarization indication during an initial access. In the second embodiment, the UE indicates its polarization capability implicitly or explicitly during initial access. In one implementation of the second embodiment, the UE autonomously transmits a PRACH preamble using the same polarization as detected in an SSB such as an SSB associated with a random access channel ("RACH") window in which the PRACH preamble is transmitted. In this implementation, the UE transmits a PRACH with LHCP if SSB is LHCP (or if SSB is detected with LHCP), or transmits a PRACH with RHCP if SSB is RHCP (or if SSB is detected with RHCP). In another implementation, all UEs look for configuration signaling of polarization and preamble root sequence information for PRACH in SIB, as indicated by gNB, and uses that for uplink. In a further implementation, multiple root sequences may be used for PRACH preamble generation. For instance, one or a group of root indices is used to indicate one type of polarization. The mapping of polarization to the root sequence number (e.g., partitioning or grouping of the PRACH sequences based on polarization type—first group of PRACH sequences associated with a first polarization, second group of PRACH sequences associated with a second polarization) may be transmitted to the UE by gNB in an SIB such as SIB1 as part of RRC RACH configuration, or it may be predefined for NTN scenarios (e.g., one beam per cell or multiple beams per cell, or based on a type of satellite system deployment). The UE may implicitly indicate its polarization type to be used for UL by selecting the corresponding root sequence when generating a random preamble.

In certain embodiments, a UE may be informed of an association and/or mapping between root sequences and polarization types by a standard or a pre-configuration (e.g., to access a particular network). In some embodiments, an association may be determined by a configuration from a network. This may be useful if a RACH procedure is performed (e.g., as part of a handover procedure); hence, if the UE is in an RRC connected state and has had prior access to the network.

In some embodiments, in scenarios where a terrestrial cellular network is augmented by NTN access (e.g., for extending the coverage, improving the coverage, dual connectivity with terrestrial and non-terrestrial access, and so forth), the association and/or mapping between root sequences and polarization types may be provided by a configuration such as an RRC IE from a terrestrial base station prior to the initial access procedure between the UE and the NTN (e.g., UE first connects and/or establishes communication with the terrestrial base station which provides assistance information (e.g., association, mapping, grouping, and/or partitioning between root sequences and polarization types) for initial access to the NTN network).

Various embodiments herein may be indicated via a dedicated configuration signaling or a cell-common (e.g., SIB) signaling from a network. The information may be carried by a field in a configuration IE (e.g., such as an NTN-AccessInfo IE) that provides information to a UE to access and communicate with an NTN.

In certain embodiments, each root sequence is associated with a polarization capability ID. For example, root sequence 1 indicates that UE supports only linear polarization, root sequence 2 indicates that the UE supports only circular polarization (e.g., LHCP and/or RHCP), root sequence 3 indicates that the UE supports all types of polarization, and so forth.

In some embodiments, a UE indicates its polarization capability either implicitly using a DMRS sequence (e.g., different DMRS base sequence based on polarization type, different cyclic shift of DMRS sequence based on polarization type, different code division multiplexing ("CDM") groups, orthogonal cover codes ("OCC"), and/or scrambling sequence generator initialization of DMRS sequence based on the polarization type) of MsgA physical uplink shared channel ("PUSCH") or explicitly in MsgA PUSCH payload for a 2-step RACH procedure.

In various embodiments, a UE transmits multiple (e.g., two) preambles in both LHCP and RHCP polarizations to indicate its polarization capabilities. In addition to the indication of UE capabilities, such configuration may enhance the uplink coverage and compensate for a polarization mismatch error in downlink. To differentiate between the LHCP and RHCP, UEs may use preambles with different root sequences and/or different cyclic shift of preamble sequence based on polarization type. In one example, the UE transmits two preambles (e.g., first preamble with a first polarization (e.g., LHCP) and a second preamble with a second polarization (e.g., RHCP) simultaneously on the same or different (e.g., frequency division multiplexing ("FDM")) set of PRACH resources in a PRACH occasion (e.g., if the UE is capable of UL-MIMO transmission on the band) or in different PRACH occasions (e.g., in time-domain). The first and second preambles may be the same preamble sequence or different preamble sequences.

In certain embodiments, if a UE has prior access to a network (e.g., UE in RRC connected state with a first serving cell) through a prior connection to an NTN, a prior connection to a terrestrial network, or for dual connectivity with a terrestrial network and an NTN, a capability signaling (e.g., from the UE to the first serving cell) may precede a RACH procedure. In such embodiments, the network may be informed of the UE's circular polarization capability and the network may provide the right configuration information (e.g., in NTN-AccessInfo IE) for NTN access (e.g., on a second serving cell) according to the capability information.

In a third embodiment, there may be a polarization indication during a connected mode. In the third embodiment, depending upon a deployment configuration of an NTN cell, a gNB may indicate polarization, and one or more of BWP, and beam ID (e.g., TCI state) with a single field in the DCI to reduce signaling overhead. In one example, there may be a direct association of polarization with BWP (e.g., frequency reuse factor ("FRF")=3). In another example, a BWP may always be associated with two circular polarization (e.g., FRF=4). A mapping table for a direct association of BWP, beam, and/or polarization, may be preconfigured, as shown in Table 1. In one example, Beam ID=0 may correspond to BWP ID=1 and LHCP, and Beam ID=7 may correspond to BWP ID=1 and RHCP. Based on the indication of beam-ID in DCI field, a UE knows a corresponding BWP-ID and polarization. This configuration may be an RRC configuration to the UE and may be further complemented by medium access control ("MAC") (e.g., MAC control element ("CE") ("MAC-CE") selecting a subset of [Beam ID, BWP ID, Polarization type)-tuples with layer 1 ("L1") and/or DCI signaling indicating the tuple-index] or L1 signaling in a dynamic manner.

Figure 4:
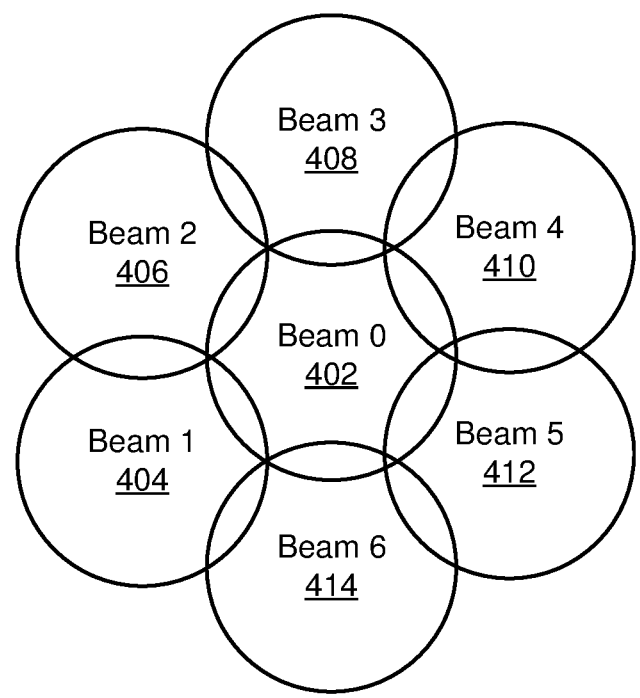
FIG. 4 is a schematic block diagram illustrating one embodiment of a system with an association of a BWP with polarization with FRF=3.

FIG. 4 is a schematic block diagram illustrating one embodiment of a system 400 with an association of a BWP with polarization with FRF=3. The system 400 includes a beam 0 402, a beam 1 404, a beam 2 406, a beam 3 408, a beam 4 410, a beam 5 412, and a beam 6 414. The beams of the system 400 may be mapped per Table 1.

TABLE 1

Mapping table for the association of Beam-ID,
BWP-ID and Polarization for FIG. 4 example

| Beam ID | BWP ID | Polarization type |
|---|---|---|
| 0 | 1 | LHCP (default) and RHCP |
| 1 | 2 | LHCP |
| 2 | 3 | RHCP |
| 3 | 2 | LHCP |
| 4 | 3 | Linear |
| 5 | 2 | Linear |
| 6 | 3 | RHCP |

Another example of jointly indicating beam (e.g., TCI state), BWP ID, and polarization type is illustrated in Table 2. For this joint indication, no individual indication for either of BWP, TCI, and polarization type is needed. The number of bits for this DCI field (e.g., the bit-width of the DCI field that may determine length and/or a codepoint in the DCI message) may be dependent up on the size of the table, which may be determined by an RRC configuration. The TCI states included in Table 2 are from the set activated by a MAC CE message or other control signaling. Also, the BWP IDs are from the multiple configured BWP IDs associated with either of DL or UL. In one example, Index=0 may correspond to TCI state 1, TCI state 2, BWP ID=1 and LHCP, and Index=7 may correspond to TCI state 1, TCI state 2, BWP ID=1 and RHCP.

Figure 5:
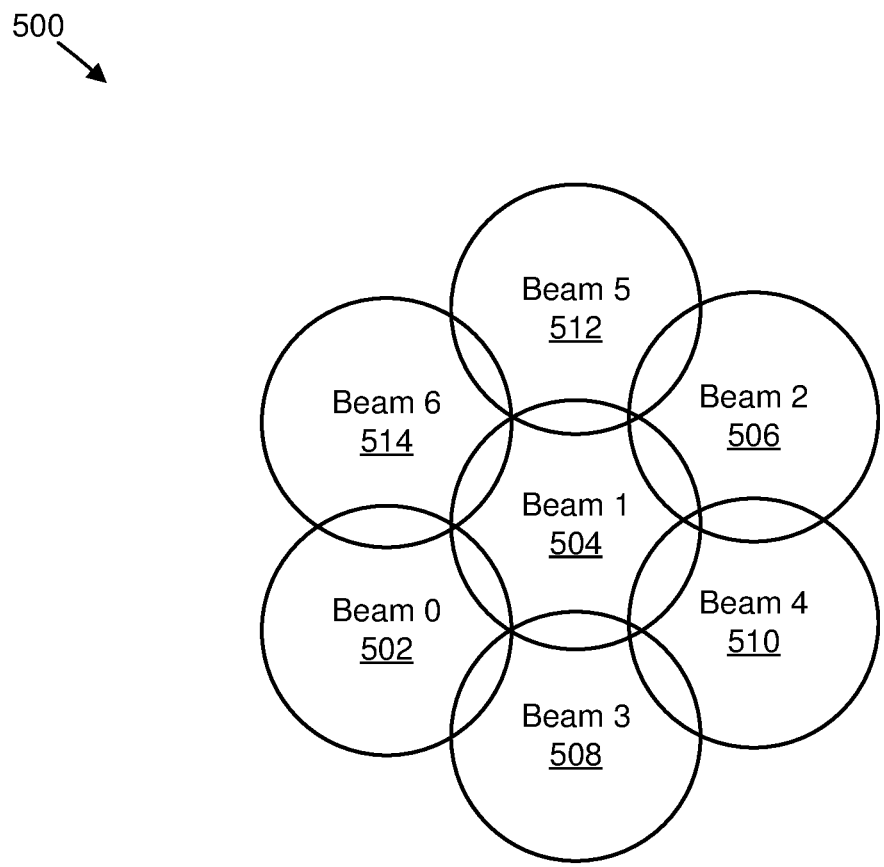
FIG. 5 is a schematic block diagram illustrating one embodiment of a system with an association of a BWP with polarization with FRF=4.

FIG. 5 is a schematic block diagram illustrating one embodiment of a system 500 with an association of a BWP with polarization with FRF=4. The system 400 includes a beam 0 502, a beam 1 504, a beam 2 506, a beam 3 508, a beam 4 510, a beam 5 512, and a beam 6 514. The beams of the system 500 may be mapped per Table 2.

TABLE 2

Mapping table for the association of Beam-ID (TCI),
BWP-ID and Polarization for FIG. 5 example

| Index | TCI | BWP ID | Polarization type |
|---|---|---|---|
| 0 | TCI state1, TCI state 2 | 1 | LHCP (default) and RHCP |
| 1 | TCI state1 | 2 | LHCP |
| 2 | TCI state3 | 3 | RHCP |
| 3 | TCI state2 | 2 | LHCP |
| 4 | TCI state1 | 3 | Linear |
| 5 | TCI state4 | 2 | Linear |
| 6 | TCI state4 | 3 | RHCP |

In various embodiments, a BWP may be associated with two polarizations (e.g., FRF 4), and beam-ID and polarization type may be configured so that odd beam-IDs correspond to one type of polarization (e.g., LHCP) while even beam-IDs correspond to other polarization (e.g., RHCP). Moreover, beam-IDs may be grouped based on corresponding BWP-IDs. For instance, in relation to FIG. 5, Beam-IDs 0, 1, and 2 may correspond to Group-1, while Beam-IDs 3, 4, 5, and 6 may correspond to Group-2. Such grouping may be preconfigured for a different number of beams in a cell. Based on the information of Beam-ID, a UE may configure a corresponding BWP (e.g., Group-ID) and polarization (e.g., odd, even).

In some embodiments, a new quasi-co-location ("QCL") type (e.g., QCL Type-E) may be used to indicate an associated between a source reference signal ("RS") and a target RS in terms of polarization type. If a TCI state indicates this new QCL Type-E, then the target RS is expected to be transmitted and/or received using the same polarization type as applied for source RS. In various embodiments, a definition of an existing QCL type such as QCL Type-D may be extended to include an association between circular polarizations (e.g., QCL-TypeD-LC to indicate LHCP, QCL-TypeD-RC to indicate RHCP). In certain embodiments, a polarization type parameter may be indicated in quasi collocation information (e.g., QCL-Info) provided in a TCI state for a source (e.g., reference) RS. In some embodiments, for UL transmission (e.g., physical uplink control channel ("PUCCH"), SRS, UL Positioning RS, PUSCH), spatialRelationInfo configuration may configure a spatial relation between a source (e.g., reference) RS and the target UL signal (e.g., SRS) or channel (e.g., PUCCH) and may include an indication of a polarization type of the source RS.

The UE may be expected to transmit an UL transmission (e.g., target UL signal or channel) with the same polarization type as that for the indicated source RS.

In various embodiments, a UE in connected mode indicates its polarization capabilities after initial access. In certain embodiments, a UE sends its polarization capability in uplink control information ("UCI") over PUCCH or PUSCH. The gNB may indicate to a UE through DCI to report its polarization capabilities. Whether or not the UE may and/or shall include a polarization type in UCI may be determined by information that the UE obtains during initial access or by a configuration.

In a fourth embodiment, there may be an indication of a polarization multiplexing mode. In the fourth embodiment, a UE may be explicitly and/or implicitly indicated through DCI of one or more of a polarization type, a number of polarizations employed (e.g., LHCP or RHCP, single, or both), a diversity or spatial multiplexing, and/or MU-MIMO.

In a first implementation of the fourth embodiment, signaling of polarization multiplexing in a single beam may be made. In such an implementation, a UE is indicated through DCI or TCI state signaling for data reception and/or transmission on both circular polarizations within a beam. A TCI state may indicate one or more polarizations to be used for data communication with that beam.

Figure 6:
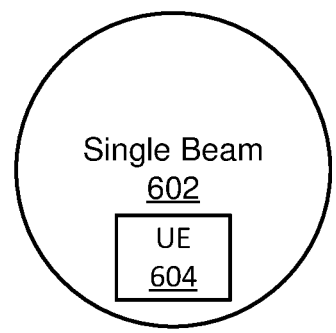
FIG. 6 is a schematic block diagram illustrating polarization multiplexing in a single beam.
Figure 7:
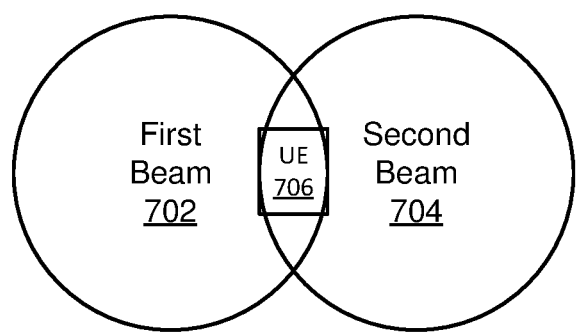
FIG. 7 is a schematic block diagram illustrating polarization multiplexing using two beams.

FIG. 6 is a schematic block diagram 600 illustrating polarization multiplexing in a single beam 602. For example, the single beam 602 includes LHCP and RHCP provided to a UE 604. FIG. 7 is a schematic block diagram 700 illustrating polarization multiplexing using two beams. Specifically, the two beams include a first beam 702 providing LHCP, and a second beam 704 providing RHCP, which are collectively provided to a UE 706.

In one embodiment, a single polarization type is indicated, two TCI states (e.g., two beams) are indicated and rank 1 and/or diversity transmission is indicated to the UE for DL reception and/or UL transmissions. In such an embodiment, two beams are deployed using the same polarization type and the same transport block ("TB") (or code block group or codeword) is transmitted on the two beams (e.g., multiple transmission and reception point ("TRP") ("multi-TRP") and/or beam transmission with the same TB, code block group ("CBG"), and/or codeword transmission).

In another embodiment, a single polarization type is indicated, two TCI states (e.g., two beams) are indicated and rank >=2 and/or spatial multiplexing transmission is indicated to the UE for DL reception and/or UL transmissions. In this embodiment, two beams are deployed using the same polarization type and different TBs (or different code block groups or different codewords) are transmitted on the two beams (e.g., multi-TRP and/or beam transmission with the different TB, CBG, and/or codeword transmission).

In certain embodiments, two polarization types may be indicated. In such embodiments, one TCI state (e.g., one beam) is indicated and rank 1 and/or diversity transmission is indicated to the UE for DL reception and/or UL transmissions. In such embodiments, one beam is deployed using two different polarization types and the same TB (or code block group or codeword) is transmitted on the two polarizations. In certain configurations, transmissions may II) be transparent to a UE and/or gNB without polarization type signaling and the UE may use any preferred polarization to receive and/or transmit the transmission.

In some embodiments, two polarization types are indicated. In such embodiments, one TCI state (e.g., one beam) is indicated and rank >=2 and/or spatial multiplexing transmission is indicated to the UE for DL reception and/or UL transmissions. In such embodiments, one beam is deployed using two different polarization types and different TBs (or different code block groups or different codewords) are transmitted on the two polarizations.

In various embodiments, two polarization types are indicated. In such embodiments, two TCI states (e.g., two beams) are indicated and rank 1 and/or diversity transmission is indicated to the UE for DL reception and/or UL transmissions. In such embodiments, a first beam is deployed using a first polarization type, and a second beam is deployed using second polarization type and the same TB (or code block group or codeword) is transmitted on the two polarizations and/or beams. In one example, a UE and/or a gNB may use one of the polarization types to receive a transmission (e.g., DL and/or UL). In another example, a UE and/or a gNB may use a first antenna (or port or antenna array) to receive a transmission with the first polarization associated with the first beam, a second antenna (or port or antenna array) to receive the transmission with the second polarization associated with the second beam, and combine (e.g., coherently) the received signals from the first antenna and the second antenna to determine the transmitted TB (or code block group or codeword).

In certain embodiments, two polarization types are indicated. In such embodiments, two TCI states (e.g., two beams) are indicated and rank >=2 and/or spatial multiplexing transmission is indicated to the UE for DL reception and/or UL transmissions. In such embodiments, a first beam is deployed using a first polarization type and transmits a first TB (or first set of code block groups or first codeword), and a second beam is deployed using a second polarization type and transmits a second TB (or second set of code block groups or second codeword). In another example, a UE and/or a gNB may use a first antenna (or port or antenna array) to receive a first TB transmission (e.g., DL and/or UL) with the first polarization associated with the first beam, a second antenna (or port or antenna array) to receive the second TB transmission with the second polarization associated with the second beam, and determine the first TB (or code block group or codeword) and the second TB (or code block group or codeword) based on the received signals from the first antenna and the second antenna. The UE and/or gNB may employ receiver structures (e.g., MMSE-SIC, MMSE-IRC) that suppress the inter-beam and/or polarization interference between the received signals from the first antenna and the second antenna.

In various embodiments, the same DMRS ports (or CDM groups) may be used for: 1) same polarization—same beam; 2) different polarization—same beam; 3) same polarization—different beams; and 4) different polarization—different beams.

In certain embodiments, if the same DMRS ports are used, then more than one codeword (e.g., when spatial multiplexing used) may be transmitted if 4 or less DMRS ports are indicated to the UE using the antenna ports indication field in the DCI. In one implementation, if the same DMRS ports are used for different polarization types (and/or different beams), initialization of the DMRS base sequences may be different and associated with a polarization type.

In some embodiments, different DMRS ports (or CDM groups) may be associated with different polarization types (and/or different beams).

In various embodiments, a UE is implicitly and/or explicitly indicated with MU-MIMO mode by a gNB such that at the same time, the UE may assume that the other orthogonal polarization type is used by some other UE using the same time-frequency resources. In one implementation, such indication may be given by an antenna indication field in DCI (using a DMRS port indication table). In another implementation, a separate field may be used to indicate either SU-MIMO (e.g., spatial multiplexing) or MU-MIMO mode. If no such field is indicated, then the UE may assume SU-MIMO on different polarization types.

In certain embodiments, a gNB indicates in DCI one or more of the types, the number of polarizations for multiplexing, diversity, or MU-MIMO for DL and/or UL transmission based on UE polarization capability signaled during the initial access or during the connected mode. In some embodiments, a gNB indicates in DCI one or more of the types, the number of polarizations for multiplexing, diversity, or MU-MIMO for DL and/or UL transmission based on UE report of DL polarization measurements.

In various embodiments, a gNB indicates in DCI one or more of the types, the number of polarizations for multiplexing, diversity, or MU-MIMO for UL transmission based on SRS measurements. The UE may be configured with resources to transmit multiple SRS—each with a different polarization type (e.g., two or more SRS with different polarization types may be configured part of the same SRS resource, or SRSs in a SRS resource may have the same polarization type). Upon detecting the multiple SRS (e.g., determining the SRS quality and/or reference signal received power ("RSRP")—such as with a predefined threshold), a gNB indicates to the UE (e.g., via SRS resource indicator ("SRI") field in DCI) the proper diversity, or multiplexing scheme for UL transmission.

In a fifth embodiment, there may be signaling of polarization multiplexing in two beams. In the fifth embodiment, a UE may be indicated through DCI to have data reception and/or transmission with two beams. In one implementation, the UE is indicated with two TCI states with two polarizations such that there is a one to one mapping of polarization with beams for data reception and/or transmission.

In another implementation, the UE, based on its location or measurement threshold, indicates to the gNB through UCI about a possibility of reception and/or transmission on both polarizations. Then the gNB configures polarizations through DCI.

In some embodiments, polarization for one beam may follow a default and/or linked polarization determined by explicit signaling (e.g., polarization of a source and/or reference RS) or obtained by an implicit method. An example of this may be if a default and/or linked polarization follows a polarization associated with a synchronization signal, a RACH message, a control message, and so forth.

In an embodiment in which a default polarization applies to a first beam, polarization of a second beam may be determined with respect to the default polarization. For example, if the polarization for the second beam is the same and/or similar to the polarization for the first beam, no polarization indication may be needed.

In certain embodiments, a polarization for a second beam may be automatically the opposite of a polarization for a first beam. For example, an RHCP polarization for a first beam (e.g., which may be a default polarization in some embodiments) may be associated with an LHCP polarization for a second beam, and vice versa. In another example, a linear polarization for a first beam may be associated with a linear polarization for a second beam.

Various embodiments herein may be extended to more than two beams. In certain embodiments, associations may be between DMRS ports and polarizations.

In some embodiments, a gNB may configure adaptive polarization for DL and/or UL HARQ retransmission such that the initial transmission is performed using a first polarization such as a linear polarization. Then if HARQ non-acknowledgement ("NACK") ("HARQ-NACK") was received, a second polarization such as a LHCP or a RHCP may be used for a re-transmission. This may improve diversity by using multiple polarizations. In such embodiments, an order in which polarization types are applied to the first transmission or a retransmission in a HARQ process may be configured by the network. The configuration may be for all HARQ processes for a UE, or per HARQ process. In various embodiments, a polarization type sequence may be indicated indicating a first polarization type to be used for and/or associated with a first transmission occasion and a second polarization type to be used for and/or associated with a second transmission occasion.

It should be noted that, as used herein, polarization types such as RHCP, LHCP, linear polarization, and so forth are presented as examples. In certain embodiments, polarization types may or may not be defined explicitly. In some embodiments, a polarization may be indicated explicitly in a standard. In various embodiments, a polarization may be indicated implicitly by indicating properties associated with the polarization. In certain embodiments, a polarization may be defined according to a configuration, a pre-configuration, a standard specification, or a combination thereof, and then referred to in subsequent communications.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mmWave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/or unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DMRS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 8:
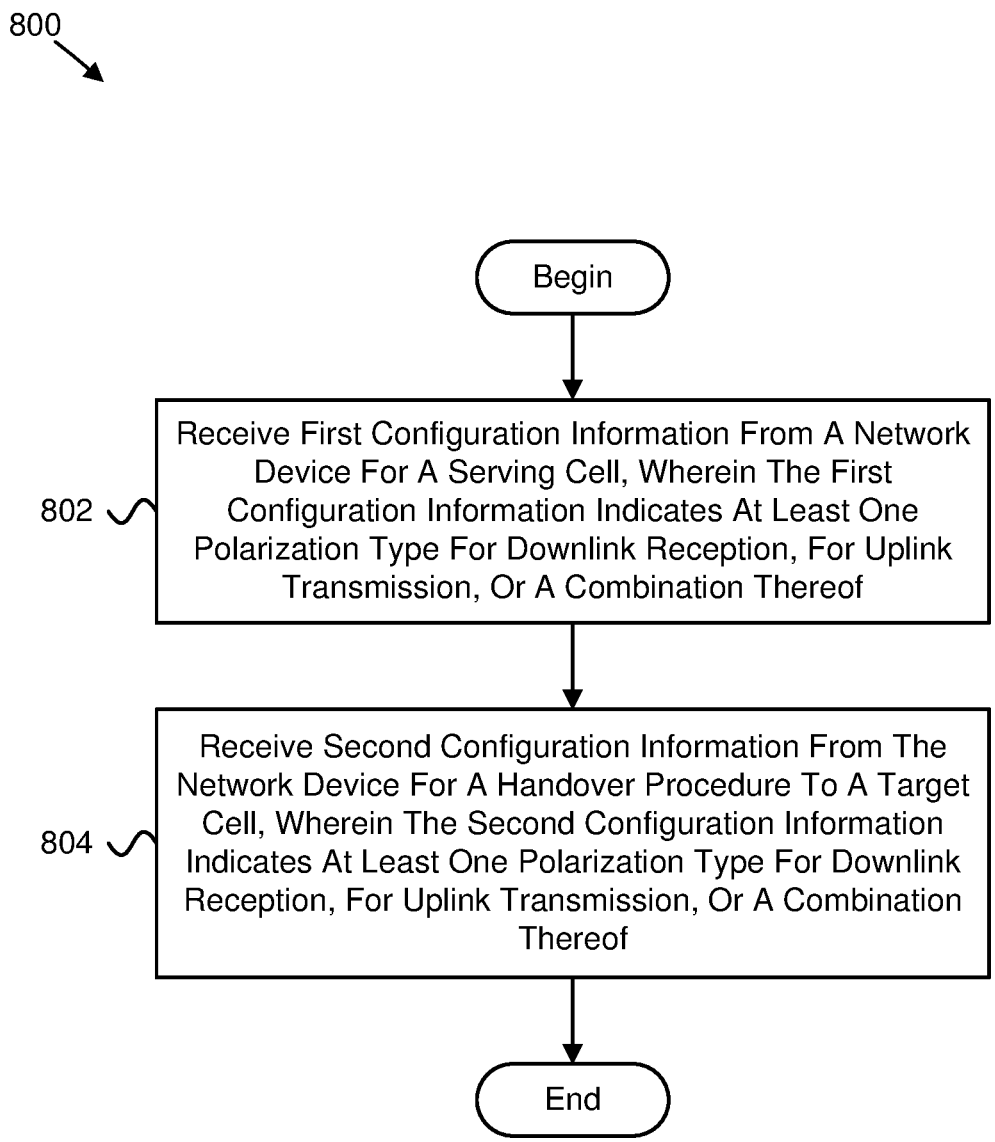
FIG. 8 is a flow chart diagram illustrating one embodiment of a method for configuring a polarization type.

FIG. 8 is a flow chart diagram illustrating one embodiment of a method 800 for configuring a polarization type. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802 first configuration information from a network device for a serving cell. The first configuration information indicates at least one polarization type for downlink reception, for uplink transmission, or a combination thereof. In some embodiments, the method 800 includes receiving 804 second configuration information from the network device for a handover procedure to a target cell. The second configuration information indicates at least one polarization type for downlink reception, for uplink transmission, or a combination thereof.

In certain embodiments, the at least one polarization type is indicated by at least one primary synchronization signal. In some embodiments, a number of cell identifiers is fixed, and the at least one primary synchronization signal is used for polarization and timing indications. In various embodiments, the at least one primary synchronization signal comprises two primary synchronization signals, a first primary synchronization signal of the two primary synchronization signals indicates a cell identifier, and a second primary synchronization signal of the two primary synchronization signals indicates a polarization.

In one embodiment, the at least one polarization type is indicated by an initialization of a demodulation reference signal sequence in a physical broadcast channel. In certain embodiments, a single polarization or multiple polarization of the at least one polarization type is associated with a frequency in a frequency raster. In some embodiments, the method 800 further comprises autonomously transmitting a physical random access channel preamble using a same polarization as detected in a synchronization signal block if no information for uplink polarization is indicated by the network device.

In various embodiments, the method 800 further comprises detecting polarization information in a system information block received from the network device and transmitting uplink data using the polarization type indicated in the system information block. In one embodiment, the method 800 further comprises detecting an indication of polarization association with at least one synchronization signal block beam. In certain embodiments, the method 800 further comprises generating a physical random access channel preamble using a plurality of root sequences, wherein at least one root sequence of the plurality of root sequences is used to indicate one type of polarization.

In some embodiments, a polarization association for the target cell is configured by the network device as part of a handover procedure. In various embodiments, the method 800 further comprises indicating a polarization capability using a demodulation reference signal sequence of a physical uplink shared channel message for a two-step random access channel procedure. In one embodiment, the method 800 further comprises transmitting multiple preambles in both of a left-hand circular prioritization and a right-hand circular prioritization to indicate polarization capabilities.

In certain embodiments, the method 800 further comprises receiving a single field in downlink control information to facilitate low signaling overhead, wherein the single field indicates a polarization type, a bandwidth part, and a beam identifier. In some embodiments, the single field comprise the beam identifier, and the polarization type and a bandwidth identifier are determined based on the beam identifier and a mapping table. In various embodiments, odd beam identifiers correspond to a first polarization type and even beam identifiers correspond to a second polarization type different from the first polarization type.

Figure 9:
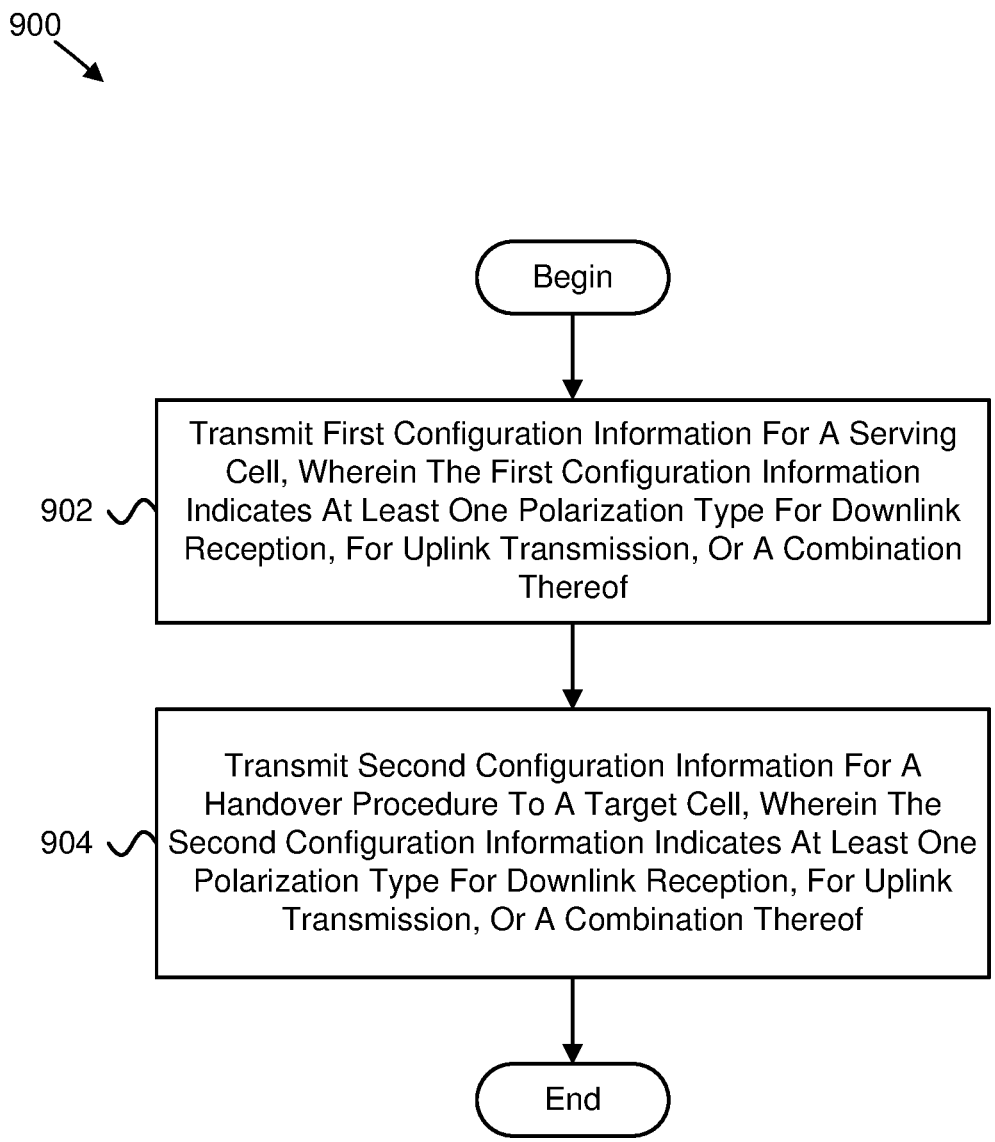
FIG. 9 is a flow chart diagram illustrating another embodiment of a method for configuring a polarization type.

FIG. 9 is a flow chart diagram illustrating another embodiment of a method 900 for configuring a polarization type. In some embodiments, the method 900 is performed by an apparatus, such as the network unit 104 and/or one or more functions of the mobile core network 140. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes transmitting 902 first configuration information for a serving cell. The first configuration information indicates at least one polarization type for downlink reception, for uplink transmission, or a combination thereof. In some embodiments, the method 900 includes transmitting 904 second configuration information for a handover procedure to a target cell. The second configuration information indicates at least one polarization type for downlink reception, for uplink transmission, or a combination thereof.

In certain embodiments, the at least one polarization type is indicated by at least one primary synchronization signal. In some embodiments, a number of cell identifiers is fixed, and the at least one primary synchronization signal is used for polarization and timing indications.

In various embodiments, the at least one primary synchronization signal comprises two primary synchronization signals, a first primary synchronization signal of the two primary synchronization signals indicates a cell identifier, and a second primary synchronization signal of the two primary synchronization signals indicates a polarization. In one embodiment, the at least one polarization type is indicated by an initialization of a demodulation reference signal sequence in a physical broadcast channel. In certain embodiments, a single polarization or multiple polarization of the at least one polarization type is associated with a frequency in a frequency raster.

In some embodiments, the method 900 further comprises receiving a physical random access channel preamble using a same polarization as detected in a synchronization signal block if no information for uplink polarization is indicated by the network device. In various embodiments, a polarization association for the target cell is configured by the network device as part of a handover procedure. In one embodiment, the method 900 further comprises receiving multiple preambles in both of a left-hand circular prioritization and a right-hand circular prioritization to indicate polarization capabilities.

In certain embodiments, the method 900 further comprises transmitting a single field in downlink control information to facilitate low signaling overhead, wherein the single field indicates a polarization type, a bandwidth part, and a beam identifier. In some embodiments, the single field comprise the beam identifier, and the polarization type and a bandwidth identifier are determined based on the beam identifier and a mapping table. In various embodiments, odd beam identifiers correspond to a first polarization type and even beam identifiers correspond to a second polarization type different from the first polarization type.

Figure 10:
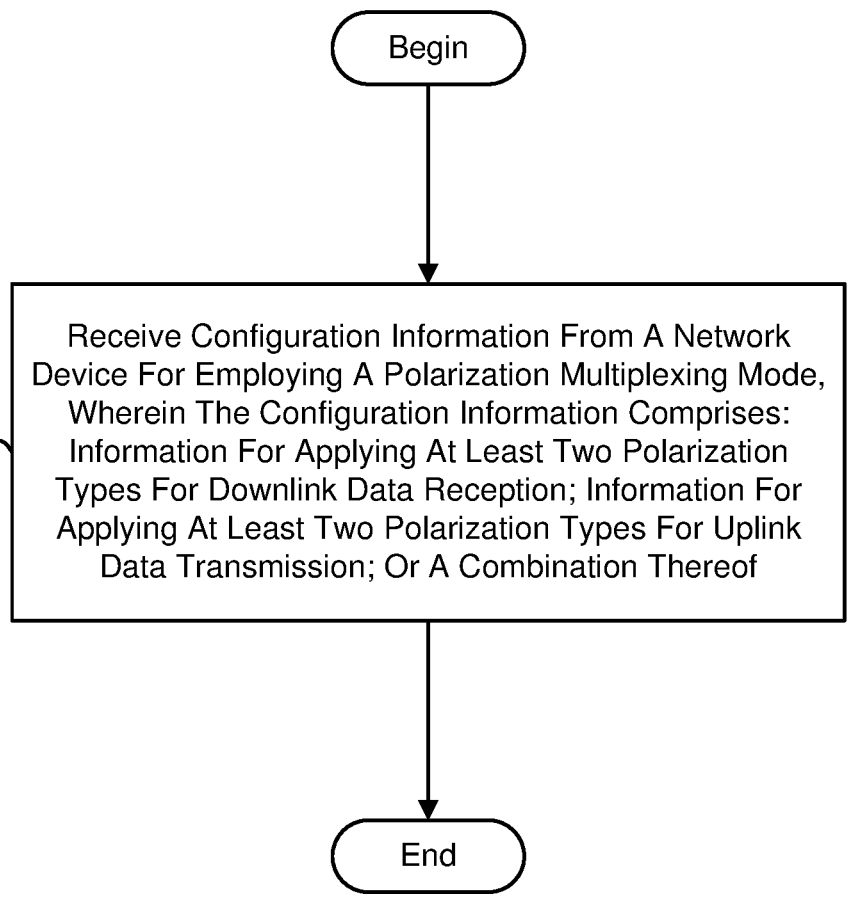
FIG. 10 is a flow chart diagram illustrating a further embodiment of a method for configuring a polarization type.

FIG. 10 is a flow chart diagram illustrating a further embodiment of a method 1000 for configuring a polarization type. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 configuration information from a network device for employing a polarization multiplexing mode. The configuration information includes: information for applying at least two polarization types for downlink data reception; information for applying at least two polarization types for uplink data transmission; or a combination thereof.

In certain embodiments, the method 1000 further comprises receiving information indicating data reception via left-hand circular polarization and right-hand circular polarization (e.g., within a beam) indicated through downlink control information or one transmission configuration indicator state.

In some embodiments, the configuration information indicates a single polarization type, two transmission configuration states, and rank one transmission for downlink reception, uplink transmission, or a combination thereof. In various embodiments, the configuration information indicates a single polarization type, two transmission configuration states, and rank two transmission for downlink reception, uplink transmission, or a combination thereof. In one embodiment, the configuration information indicates data reception with two beams via downlink configuration information or multiple transmission configuration indicator states.

In certain embodiments, a default polarization applies to a first beam, and polarization of a second beam is determined based on the default polarization. In some embodiments, a polarization for a second beam is opposite to a polarization for a first beam. In various embodiments, the configuration information indicates adaptive polarization for hybrid automatic repeat request retransmission.

Figure 11:
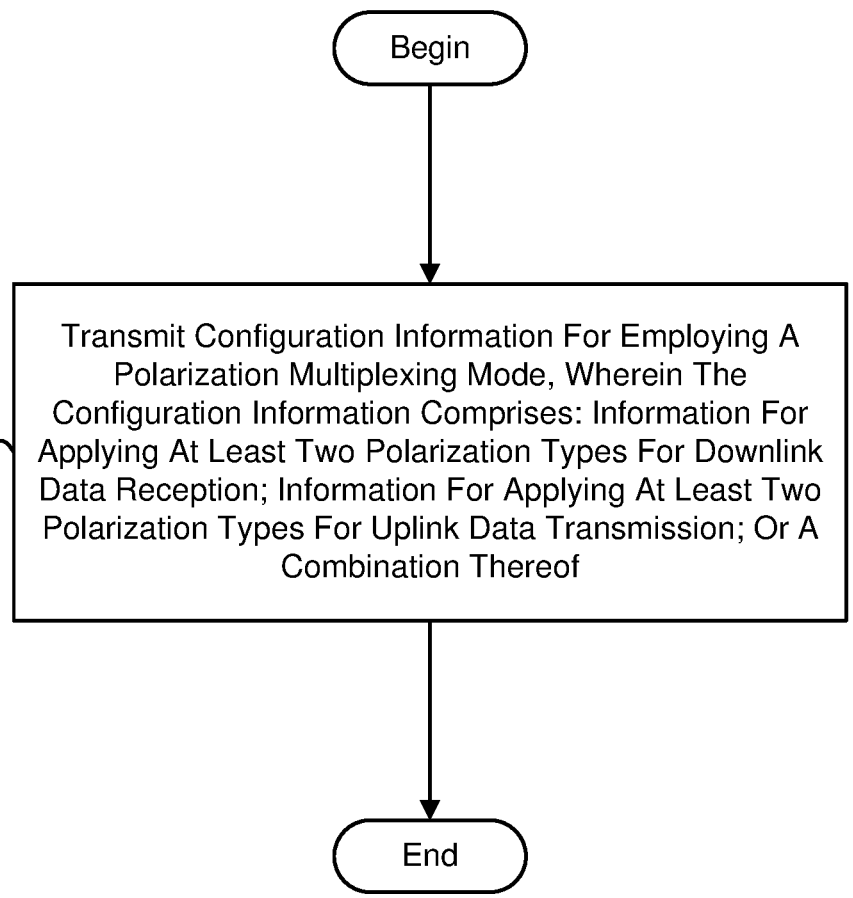
FIG. 11 is a flow chart diagram illustrating yet another embodiment of a method for configuring a polarization type.

FIG. 11 is a flow chart diagram illustrating yet another embodiment of a method 1100 for configuring a polarization type. In some embodiments, the method 1100 is performed by an apparatus, such as the network unit 104 and/or one or more functions of the mobile core network 140. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102 configuration information for employing a polarization multiplexing mode. The configuration information includes: information for applying at least two polarization types for downlink data reception; information for applying at least two polarization types for uplink data transmission; or a combination thereof.

In certain embodiments, the method 1100 further comprises transmitting information indicating data reception via left-hand circular polarization and right-hand circular polarization (e.g., within a beam) indicated through downlink control information or one transmission configuration indicator state.

In some embodiments, the configuration information indicates a single polarization type, two transmission configuration states, and rank one transmission for downlink reception, uplink transmission, or a combination thereof. In various embodiments, the configuration information indicates a single polarization type, two transmission configuration states, and rank two transmission for downlink reception, uplink transmission, or a combination thereof. In one embodiment, the configuration information indicates data reception with two beams via downlink configuration information or multiple transmission configuration indicator states.

In certain embodiments, a default polarization applies to a first beam, and polarization of a second beam is determined based on the default polarization. In some embodiments, a polarization for a second beam is opposite to a polarization for a first beam. In various embodiments, the configuration information indicates adaptive polarization for hybrid automatic repeat request retransmission.

In one embodiment, a method of a user equipment comprises: receiving first configuration information from a network device for a serving cell, wherein the first configuration information indicates at least one polarization type for downlink reception, for uplink transmission, or a combination thereof; and receiving second configuration information from the network device for a handover procedure to a target cell, wherein the second configuration information indicates at least one polarization type for downlink reception, for uplink transmission, or a combination thereof.

In certain embodiments, the at least one polarization type is indicated by at least one primary synchronization signal.

In some embodiments, a number of cell identifiers is fixed, and the at least one primary synchronization signal is used for polarization and timing indications.

In various embodiments, the at least one primary synchronization signal comprises two primary synchronization signals, a first primary synchronization signal of the two primary synchronization signals indicates a cell identifier, and a second primary synchronization signal of the two primary synchronization signals indicates a polarization.

In one embodiment, the at least one polarization type is indicated by an initialization of a demodulation reference signal sequence in a physical broadcast channel.

In certain embodiments, a single polarization or multiple polarization of the at least one polarization type is associated with a frequency in a frequency raster.

In some embodiments, the method further comprises autonomously transmitting a physical random access channel preamble using a same polarization as detected in a synchronization signal block if no information for uplink polarization is indicated by the network device.

In various embodiments, the method further comprises detecting polarization information in a system information block received from the network device and transmitting uplink data using the polarization type indicated in the system information block.

In one embodiment, the method further comprises detecting an indication of polarization association with at least one synchronization signal block beam.

In certain embodiments, the method further comprises generating a physical random access channel preamble using a plurality of root sequences, wherein at least one root sequence of the plurality of root sequences is used to indicate one type of polarization.

In some embodiments, a polarization association for the target cell is configured by the network device as part of a handover procedure.

In various embodiments, the method further comprises indicating a polarization capability using a demodulation reference signal sequence of a physical uplink shared channel message for a two-step random access channel procedure.

In one embodiment, the method further comprises transmitting multiple preambles in both of a left-hand circular prioritization and a right-hand circular prioritization to indicate polarization capabilities.

In certain embodiments, the method further comprises receiving a single field in downlink control information to facilitate low signaling overhead, wherein the single field indicates a polarization type, a bandwidth part, and a beam identifier.

In some embodiments, the single field comprise the beam identifier, and the polarization type and a bandwidth identifier are determined based on the beam identifier and a mapping table.

In various embodiments, odd beam identifiers correspond to a first polarization type and even beam identifiers correspond to a second polarization type different from the first polarization type.

In one embodiment, an apparatus comprises a user equipment. The apparatus further comprises: a receiver that: receives first configuration information from a network device for a serving cell, wherein the first configuration information indicates at least one polarization type for downlink reception, for uplink transmission, or a combination thereof; and receives second configuration information from the network device for a handover procedure to a target cell, wherein the second configuration information indicates at least one polarization type for downlink reception, for uplink transmission, or a combination thereof.

In certain embodiments, the at least one polarization type is indicated by at least one primary synchronization signal.

In some embodiments, a number of cell identifiers is fixed, and the at least one primary synchronization signal is used for polarization and timing indications.

In various embodiments, the at least one primary synchronization signal comprises two primary synchronization signals, a first primary synchronization signal of the two primary synchronization signals indicates a cell identifier, and a second primary synchronization signal of the two primary synchronization signals indicates a polarization.

In one embodiment, the at least one polarization type is indicated by an initialization of a demodulation reference signal sequence in a physical broadcast channel.

In certain embodiments, a single polarization or multiple polarization of the at least one polarization type is associated with a frequency in a frequency raster.

In some embodiments, the apparatus further comprises a transmitter that autonomously transmits a physical random access channel preamble using a same polarization as detected in a synchronization signal block if no information for uplink polarization is indicated by the network device.

In various embodiments, the apparatus further comprises a processor that detects polarization information in a system information block received from the network device and transmitting uplink data using the polarization type indicated in the system information block.

In one embodiment, the processor detects an indication of polarization association with at least one synchronization signal block beam.

In certain embodiments, the apparatus further comprises a processor that generates a physical random access channel preamble using a plurality of root sequences, wherein at least one root sequence of the plurality of root sequences is used to indicate one type of polarization.

In some embodiments, a polarization association for the target cell is configured by the network device as part of a handover procedure.

In various embodiments, the apparatus further comprises a processor that indicates a polarization capability using a demodulation reference signal sequence of a physical uplink shared channel message for a two-step random access channel procedure.

In one embodiment, the apparatus further comprises a transmitter that transmits multiple preambles in both of a left-hand circular prioritization and a right-hand circular prioritization to indicate polarization capabilities.

In certain embodiments, the receiver receives a single field in downlink control information to facilitate low signaling overhead, and the single field indicates a polarization type, a bandwidth part, and a beam identifier.

In some embodiments, the single field comprise the beam identifier, and the polarization type and a bandwidth identifier are determined based on the beam identifier and a mapping table.

In various embodiments, odd beam identifiers correspond to a first polarization type and even beam identifiers correspond to a second polarization type different from the first polarization type.

In one embodiment, a method of a network device comprises: transmitting first configuration information for a serving cell, wherein the first configuration information indicates at least one polarization type for downlink reception, for uplink transmission, or a combination thereof; and transmitting second configuration information for a handover procedure to a target cell, wherein the second configuration information indicates at least one polarization type for downlink reception, for uplink transmission, or a combination thereof.

In certain embodiments, the at least one polarization type is indicated by at least one primary synchronization signal.

In some embodiments, a number of cell identifiers is fixed, and the at least one primary synchronization signal is used for polarization and timing indications.

In various embodiments, the at least one primary synchronization signal comprises two primary synchronization signals, a first primary synchronization signal of the two primary synchronization signals indicates a cell identifier, and a second primary synchronization signal of the two primary synchronization signals indicates a polarization.

In one embodiment, the at least one polarization type is indicated by an initialization of a demodulation reference signal sequence in a physical broadcast channel.

In certain embodiments, a single polarization or multiple polarization of the at least one polarization type is associated with a frequency in a frequency raster.

In some embodiments, the method further comprises receiving a physical random access channel preamble using a same polarization as detected in a synchronization signal block if no information for uplink polarization is indicated by the network device.

In various embodiments, a polarization association for the target cell is configured by the network device as part of a handover procedure.

In one embodiment, the method further comprises receiving multiple preambles in both of a left-hand circular prioritization and a right-hand circular prioritization to indicate polarization capabilities.

In certain embodiments, the method further comprises transmitting a single field in downlink control information to facilitate low signaling overhead, wherein the single field indicates a polarization type, a bandwidth part, and a beam identifier.

In some embodiments, the single field comprise the beam identifier, and the polarization type and a bandwidth identifier are determined based on the beam identifier and a mapping table.

In various embodiments, odd beam identifiers correspond to a first polarization type and even beam identifiers correspond to a second polarization type different from the first polarization type.

In one embodiment, an apparatus comprises a network device. The apparatus further comprises: a transmitter that: transmits first configuration information for a serving cell, wherein the first configuration information indicates at least one polarization type for downlink reception, for uplink transmission, or a combination thereof; and transmits second configuration information for a handover procedure to a target cell, wherein the second configuration information indicates at least one polarization type for downlink reception, for uplink transmission, or a combination thereof.

In certain embodiments, the at least one polarization type is indicated by at least one primary synchronization signal.

In some embodiments, a number of cell identifiers is fixed, and the at least one primary synchronization signal is used for polarization and timing indications.

In various embodiments, the at least one primary synchronization signal comprises two primary synchronization signals, a first primary synchronization signal of the two primary synchronization signals indicates a cell identifier, and a second primary synchronization signal of the two primary synchronization signals indicates a polarization.

In one embodiment, the at least one polarization type is indicated by an initialization of a demodulation reference signal sequence in a physical broadcast channel.

In certain embodiments, a single polarization or multiple polarization of the at least one polarization type is associated with a frequency in a frequency raster.

In some embodiments, the apparatus further comprises a receiver that receives a physical random access channel preamble using a same polarization as detected in a synchronization signal block if no information for uplink polarization is indicated by the network device.

In various embodiments, a polarization association for the target cell is configured by the network device as part of a handover procedure.

In one embodiment, the apparatus further comprises a receiver that receives multiple preambles in both of a left-hand circular prioritization and a right-hand circular prioritization to indicate polarization capabilities.

In certain embodiments, the transmitter transmits a single field in downlink control information to facilitate low signaling overhead, and the single field indicates a polarization type, a bandwidth part, and a beam identifier.

In some embodiments, the single field comprise the beam identifier, and the polarization type and a bandwidth identifier are determined based on the beam identifier and a mapping table.

In various embodiments, odd beam identifiers correspond to a first polarization type and even beam identifiers correspond to a second polarization type different from the first polarization type.

In one embodiment, a method of a user equipment comprises: receiving configuration information from a network device for employing a polarization multiplexing mode, wherein the configuration information comprises: information for applying at least two polarization types for downlink data reception; information for applying at least two polarization types for uplink data transmission; or a combination thereof.

In certain embodiments, the method further comprises receiving information indicating data reception via left-hand circular polarization and right-hand circular polarization (e.g., within a beam) indicated through downlink control information or one transmission configuration indicator state.

In some embodiments, the configuration information indicates a single polarization type, two transmission configuration states, and rank one transmission for downlink reception, uplink transmission, or a combination thereof.

In various embodiments, the configuration information indicates a single polarization type, two transmission configuration states, and rank two transmission for downlink reception, uplink transmission, or a combination thereof.

In one embodiment, the configuration information indicates data reception with two beams via downlink configuration information or multiple transmission configuration indicator states.

In certain embodiments, a default polarization applies to a first beam, and polarization of a second beam is determined based on the default polarization.

In some embodiments, a polarization for a second beam is opposite to a polarization for a first beam.

In various embodiments, the configuration information indicates adaptive polarization for hybrid automatic repeat request retransmission.

In one embodiment, an apparatus comprises a user equipment. The apparatus further comprises: a receiver that receives configuration information from a network device for employing a polarization multiplexing mode, wherein the configuration information comprises: information for applying at least two polarization types for downlink data reception; information for applying at least two polarization types for uplink data transmission; or a combination thereof.

In certain embodiments, the receiver receives information indicating data reception via left-hand circular polarization and right-hand circular polarization (e.g., within a beam) indicated through downlink control information or one transmission configuration indicator state.

In some embodiments, the configuration information indicates a single polarization type, two transmission configuration states, and rank one transmission for downlink reception, uplink transmission, or a combination thereof.

In various embodiments, the configuration information indicates a single polarization type, two transmission configuration states, and rank two transmission for downlink reception, uplink transmission, or a combination thereof.

In one embodiment, the configuration information indicates data reception with two beams via downlink configuration information or multiple transmission configuration indicator states.

In certain embodiments, a default polarization applies to a first beam, and polarization of a second beam is determined based on the default polarization.

In some embodiments, a polarization for a second beam is opposite to a polarization for a first beam.

In various embodiments, the configuration information indicates adaptive polarization for hybrid automatic repeat request retransmission.

In one embodiment, a method of a network device comprises: transmitting configuration information for employing a polarization multiplexing mode, wherein the configuration information comprises: information for applying at least two polarization types for downlink data reception; information for applying at least two polarization types for uplink data transmission; or a combination thereof.

In certain embodiments, the method further comprises transmitting information indicating data reception via left-hand circular polarization and right-hand circular polarization (e.g., within a beam) indicated through downlink control information or one transmission configuration indicator state.

In some embodiments, the configuration information indicates a single polarization type, two transmission configuration states, and rank one transmission for downlink reception, uplink transmission, or a combination thereof.

In various embodiments, the configuration information indicates a single polarization type, two transmission configuration states, and rank two transmission for downlink reception, uplink transmission, or a combination thereof.

In one embodiment, the configuration information indicates data reception with two beams via downlink configuration information or multiple transmission configuration indicator states.

In certain embodiments, a default polarization applies to a first beam, and polarization of a second beam is determined based on the default polarization.

In some embodiments, a polarization for a second beam is opposite to a polarization for a first beam.

In various embodiments, the configuration information indicates adaptive polarization for hybrid automatic repeat request retransmission.

In one embodiment, an apparatus comprises a network device. The apparatus further comprises: a transmitter that transmits configuration information for employing a polarization multiplexing mode, wherein the configuration information comprises: information for applying at least two polarization types for downlink data reception; information for applying at least two polarization types for uplink data transmission; or a combination thereof.

In certain embodiments, the transmitter transmits information indicating data reception via left-hand circular polarization and right-hand circular polarization (e.g., within a beam) indicated through downlink control information or one transmission configuration indicator state.

In some embodiments, the configuration information indicates a single polarization type, two transmission configuration states, and rank one transmission for downlink reception, uplink transmission, or a combination thereof.

In various embodiments, the configuration information indicates a single polarization type, two transmission configuration states, and rank two transmission for downlink reception, uplink transmission, or a combination thereof.

In one embodiment, the configuration information indicates data reception with two beams via downlink configuration information or multiple transmission configuration indicator states.

In certain embodiments, a default polarization applies to a first beam, and polarization of a second beam is determined based on the default polarization.

In some embodiments, a polarization for a second beam is opposite to a polarization for a first beam.

In various embodiments, the configuration information indicates adaptive polarization for hybrid automatic repeat request retransmission.

In one embodiment, the configuration information indicates two polarization types, one transmission configuration state, and rank one transmission for downlink reception, uplink transmission, or a combination thereof.

In certain embodiments, the configuration information indicates two polarization types, one transmission configuration state, and rank two transmission for downlink reception, uplink transmission, or a combination thereof.

In some embodiments, the configuration information indicates two polarization types, two transmission configuration states, and rank one transmission for downlink reception, uplink transmission, or a combination thereof.

In various embodiments, the configuration information indicates two polarization types, two transmission configuration states, and rank one transmission for downlink reception, uplink transmission, or a combination thereof.

In one embodiment, the method further comprises associating the same demodulation reference symbols ports with the same or different polarization types and the same or different beams.

In certain embodiments, the method further comprises associating different demodulation reference symbols ports with the same or different polarization types and the same or different beams.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment (UE), the method comprising:
receiving configuration information for employing a polarization multiplexing mode, wherein the configuration information comprises:
information for applying at least two polarization types for downlink data reception; or
information for applying at least two polarization types for uplink data transmission;
or a combination thereof;
wherein a default polarization applies to a first beam, and polarization of a second beam is determined based on the default polarization.

2. The method of claim 1, further comprising receiving information indicating data reception via left-hand circular polarization and right-hand circular polarization indicated through downlink control information (DCI) or one transmission configuration indicator (TCI) state.

3. The method of claim 1, wherein the configuration information indicates a single polarization type, two transmission configuration states, and rank one transmission for downlink reception, or uplink transmission, or a combination thereof.

4. The method of claim 1, wherein the configuration information indicates a single polarization type, two transmission configuration states, and rank two transmission for downlink reception, or uplink transmission, or a combination thereof.

5. The method of claim 1, wherein the configuration information indicates two polarization types, one transmission configuration state, and rank one transmission for downlink reception, or uplink transmission, or a combination thereof.

6. The method of claim 1, wherein the configuration information indicates two polarization types, one transmission configuration state, and rank two transmission for downlink reception, or uplink transmission, or a combination thereof.

7. The method of claim 1, wherein the configuration information indicates two polarization types, two transmission configuration states, and rank one transmission for downlink reception, or uplink transmission, or a combination thereof.

8. The method of claim 1, wherein the configuration information indicates two polarization types, two transmission configuration states, and rank one transmission for downlink reception, or uplink transmission, or a combination thereof.

9. The method of claim 1, further comprising associating same demodulation reference symbols (DMRS) ports with same or different polarization types and same or different beams.

10. The method of claim 1, further comprising associating different demodulation reference symbols (DMRS) ports with same or different polarization types and same or different beams.

11. The method of claim 1, wherein the configuration information indicates data reception with two beams via downlink configuration information (DCI) or multiple transmission configuration indicator (TCI) states.

12. The method of claim 1, wherein a polarization for a second beam is opposite to a polarization for a first beam.

13. A user equipment (UE), comprising:
at least one memory; and
at least one processor coupled with the at least one memory and configured to cause the UE to:
receive configuration information for employing a polarization multiplexing mode, wherein the configuration information comprises:
information for applying at least two polarization types for downlink data reception; or
information for applying at least two polarization types for uplink data transmission;
or a combination thereof;
wherein a default polarization applies to a first beam, and polarization of a second beam is determined based on the default polarization.

14. The UE of claim 13, wherein the at least one processor is configured to cause the UE to receive information indicating data reception via left-hand circular polarization and right-hand circular polarization indicated through downlink control information (DCI) or one transmission configuration indicator (TCI) state.

15. The UE of claim 13, wherein the configuration information indicates a single polarization type, two transmission configuration states, and rank one transmission for downlink reception, or uplink transmission, or a combination thereof.

16. The UE of claim 13, wherein the configuration information indicates a single polarization type, two transmission configuration states, and rank two transmission for downlink reception, or uplink transmission, or a combination thereof.

17. The UE of claim 13, wherein the configuration information indicates two polarization types, one transmission configuration state, and rank one transmission for downlink reception, or uplink transmission, or a combination thereof.

18. The UE of claim 13, wherein the configuration information indicates two polarization types, one transmission configuration state, and rank two transmission for downlink reception, or uplink transmission, or a combination thereof.

19. A base station, comprising:
at least one memory; and
at least one processor coupled with the at least one memory and configured to cause the base station to:
transmit configuration information for employing a polarization multiplexing mode, wherein the configuration information comprises:
information for applying at least two polarization types for downlink data reception; or
information for applying at least two polarization types for uplink data transmission;
or a combination thereof;
wherein a default polarization applies to a first beam, and polarization of a second beam is determined based on the default polarization.

20. A method performed by a base station, the method comprising:
transmitting configuration information for employing a polarization multiplexing mode, wherein the configuration information comprises:
information for applying at least two polarization types for downlink data reception; or
information for applying at least two polarization types for uplink data transmission;
or a combination thereof;
wherein a default polarization applies to a first beam, and polarization of a second beam is determined based on the default polarization.

* * * * *